(12) United States Patent
Tonon et al.

(10) Patent No.: US 10,323,574 B2
(45) Date of Patent: Jun. 18, 2019

(54) MIXER FOR ADMIXING A DILUTION AIR TO THE HOT GAS FLOW

(71) Applicant: ANSALDO ENERGIA SWITZERLAND AG, Baden (CH)

(72) Inventors: Devis Tonon, Turgi (CH); Mirko Ruben Bothien, Zürich (CH); Luis Tay Wo Chong Hilares, Neuenhof (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 508 days.

(21) Appl. No.: 14/974,622

(22) Filed: Dec. 18, 2015

(65) Prior Publication Data

US 2016/0177832 A1 Jun. 23, 2016

(30) Foreign Application Priority Data

Dec. 22, 2014 (EP) ...................................... 14199762

(51) Int. Cl.
*F02C 3/20* (2006.01)
*F23C 9/08* (2006.01)
(Continued)

(52) U.S. Cl.
CPC .................. *F02C 7/18* (2013.01); *F02C 3/20* (2013.01); *F23C 9/08* (2013.01); *F23M 20/005* (2015.01);
(Continued)

(58) Field of Classification Search
CPC .... F02C 3/20; F02C 7/18; F23C 6/042; F23C 9/08; F23R 3/002; F23R 3/045;
(Continued)

(56) References Cited

U.S. PATENT DOCUMENTS 4,255,927 A * 3/1981 Johnson .................... F23R 3/26
60/39.23
4,833,881 A 5/1989 Vdoviak et al.
(Continued)

FOREIGN PATENT DOCUMENTS

CN 1743734 A 3/2006
CN 103195507 A 7/2013
(Continued)

OTHER PUBLICATIONS

Office Action (Communication) dated Oct. 5, 2017, by the European Patent Office in corresponding European Patent Application No. 14199762.7. (4 pages).
(Continued)

*Primary Examiner* — Gerald L Sung
*Assistant Examiner* — James P McGlynn
(74) *Attorney, Agent, or Firm* — Buchanan Ingersoll & Rooney PC (57) ABSTRACT

The invention refers to a combustor arrangement of a gas turbine engine or power plant, having at least one combustion chamber, at least one mixer for admixing a dilution medium or air to the hot gas flow leaving the combustion chamber. The mixer is configured to guide combustion gases in a hot gas flow path extending downstream of the combustion chamber, wherein the mixer includes a plurality of injection pipes pointing inwards from the side walls of the mixer for admixing the dilution medium or air to cool the hot gas flow leaving combustion chamber. The mixer includes at least one dilution air plenum having at least one pressure-controlled compartment which is directly or indirectly connected to at least one injection pipe.

15 Claims, 4 Drawing Sheets

(51) Int. Cl.
  *F02C 7/18* (2006.01)
  *F23R 3/04* (2006.01)
  *F23R 3/06* (2006.01)
  *F23M 20/00* (2014.01)

(52) U.S. Cl.
  CPC .............. *F23R 3/045* (2013.01); *F23R 3/06* (2013.01); *F23R 2900/00014* (2013.01); *F23R 2900/03341* (2013.01)

(58) Field of Classification Search
  CPC .... F23R 3/06; F23R 3/26; F23R 3/346; F23R 2900/00014; F23R 2900/03341; F23M 20/005
  See application file for complete search history.

(56) References Cited

U.S. PATENT DOCUMENTS

| | | | |
|---|---|---|---|
| 4,932,861 A | 6/1990 | Keller et al. | |
| 5,454,221 A * | 10/1995 | Loprinzo | F23R 3/045 60/757 |
| 5,588,826 A | 12/1996 | Doebbeling et al. | |
| 6,711,900 B1 | 3/2004 | Patel et al. | |
| 7,000,396 B1 | 2/2006 | Storey | |
| 7,549,290 B2 * | 6/2009 | Holt | F23M 5/085 431/114 |
| 9,011,079 B2 | 4/2015 | Coign et al. | |
| 9,335,051 B2 * | 5/2016 | Jarmon | F23R 3/16 |
| 2004/0159106 A1 | 8/2004 | Patel et al. | |
| 2005/0166596 A1 | 8/2005 | Sattinger | |
| 2006/0042256 A1 | 3/2006 | Storey | |
| 2006/0059913 A1 | 3/2006 | Bethke et al. | |
| 2007/0234726 A1 | 10/2007 | Patel et al. | |
| 2010/0218503 A1 | 9/2010 | Bronson et al. | |
| 2011/0220433 A1 | 9/2011 | Nakamura et al. | |
| 2012/0036859 A1 * | 2/2012 | Johnson | F01D 9/023 60/772 |
| 2013/0019604 A1 | 1/2013 | Cunha et al. | |
| 2013/0177384 A1 | 7/2013 | Coign et al. | |
| 2014/0109591 A1 | 4/2014 | Bothien et al. | |
| 2015/0159876 A1 | 6/2015 | Freitag et al. | |

FOREIGN PATENT DOCUMENTS

| | | |
|---|---|---|
| DE | 103 12 971 A1 | 12/2004 |
| EP | 0 321 809 A1 | 6/1989 |
| EP | 0 704 657 A2 | 4/1996 |
| EP | 2 224 170 A2 | 9/2010 |
| EP | 2 549 186 A2 | 1/2013 |
| GB | 2 017 827 A | 10/1979 |
| JP | 59-13829 A | 1/1984 |
| WO | WO 2014/029512 A2 | 2/2014 |
| WO | WO 2014/063835 A1 | 5/2014 |
| WO | WO 2014/173578 A1 | 10/2014 |

OTHER PUBLICATIONS

Partial Search Report dated Jun. 3, 2015, by the European Patent Office for Application No. 14199762.7.

Extended Search Report dated Nov. 9, 2015, by the European Patent Office for Application No. 14199762.7.

Office Action (First Office Action) dated Dec. 11, 2018, by the State Intellectual Property Office of People's Republic of China in corresponding Chinese Patent Application No. 201511036167.4 and an English Translation of the Office Action. (14 pages).

* cited by examiner

MIXER FOR ADMIXING A DILUTION AIR TO THE HOT GAS FLOW

TECHNICAL FIELD

The invention refers to a combustor arrangement of a gas turbine engine or power plant, comprising at least one combustion chamber, at least one mixer for admixing a dilution medium or air to the hot gas flow leaving the combustion chamber, wherein the mixer is adapted to guide combustion gases in a hot gas flow path extending downstream of the combustion chamber, wherein the mixer comprises a plurality of injection pipes pointing inwards from the side walls of the mixer for admixing the dilution medium or air to cool the hot gas flow leaving combustion chamber.

Preferentially, the invention refers to gas turbine engine comprising a single combustor or a sequential combustor arrangement. The sequential combustion arrangement comprising a first burner, a first combustion chamber, a mixer for admixing a dilution gas to the hot gases leaving the first combustion chamber during operation, a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second combustion chamber.

Additionally, the component of an operational arrangement concerns for example a can-combustor of a gas turbine engine. Moreover, an operational arrangement concerns also every other engine that may be subject to a combustion.

As one example the invention refers to a gas turbine engine having a pattern of several can-combustors disposed around rotational contour.

Can-combustors are self-contained cylindrical combustion chambers. Each "can-combustor" has its own fuel injector, igniter, liner, and casing. The primary air from the compressor is guided into each individual can-combustor, where it is decelerated, mixed with fuel, and then ignited. The secondary air also comes from the compressor, where it is fed outside of the liner (inside of which is where the combustion is taking place). The secondary air is then fed, usually through slits in the liner, into the combustion zone to cool the liner via thin film cooling.

Furthermore, multiple can-combustors are arranged around the central axis of the engine, and their shared exhaust is fed to the turbine(s). Can-combustors were most widely used in early gas turbine engines, owing to their ease of design and testing (one can test a single can, rather than have to test the whole system). Can-combustors are easy to maintain, as only a single can needs to be removed, rather than the whole combustion section.

The focused gas turbine engine comprising a compressor, downstream of the compressor several can-combustors, whereas the hot gases of the can-combustors are admitted to a turbine, whereas the can-combustors operating on the basis of can-combustor architecture.

Additionally, another gas turbine engine comprising a compressor, downstream of the compressor first can-combustor arrangement, whereas the hot gases of the first can-combustor arrangement are admitted to a first turbine or to a second can-combustor arrangement, whereas the hot gases of the second can-combustor arrangement are admitted to a second turbine or to a subsequent steam cycle, whereas at least one can-combustor arrangement operating on the basis of a can-combustor architecture.

Furthermore, at least one can-combustor comprising one or more disposed premixing burners or semi-premixing burners. A first turbine is connected to receive working gas from the first can-combustor arrangement, a second can-combustor arrangement is connected to receive exhausted working gas from the first turbine and to deliver working gas to the second turbine, wherein the second can-combustor arrangement comprises an annular duct forming a combustion space extending in a flow direction from outlet of the first turbine to an inlet of the second turbine, and means for introducing fuel into the second can-combustor arrangement for self-ignition combustion.

Moreover, the operational use of the apparatus of the present invention also refers preferably to a further type of combustor, namely is the cannular combustor. Like the can-combustor, can annular combustors have discrete combustion zones contained in separate liners with their own fuel-injectors. Unlike the can-combustor, all the combustion zones share a common ring (annulus) casing. Each combustion zone no longer has to serve as a pressure vessel. The combustion zones can also "communicate" with each other via liner holes or connecting tubes or pipes that allow some air to flow circumferentially. The exit flow from the cannular combustor generally has a more uniform temperature profile, which is better for the turbine section. It also eliminates the need for each chamber to have its own igniter. Once the fire is lit in one or two can-combustors, it can easily spread to and ignite the others.

The combustor of the gas turbine engine comprising at least one premix burner, these should preferably be formed by the combustion process and objects according to the documents EP 0 321 809 A1 and/or EP 0 704 657 A2, wherein these documents forming an integral part of the present description. In particular, said premix burners can be operated with liquid and/or gaseous fuels of all kinds. Thus, it is readily possible to provide different fuels within the individual cans. This means also that a premix burner can also be operated simultaneously with different fuels.

BACKGROUND OF THE INVENTION

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and operational flexibility sequential combustion has been suggested in DE 10312971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Conventional cooling methods either require heat exchanger structures which lead to high pressure drops in the main hot gas flow or suggest injection of a cooling medium from the side walls. For injection of a cooling medium from the side walls a high pressure drop is required which is detrimental to the efficiency of a gas turbine operated with such a combustor arrangement and a controlled cooling of the whole flow is difficult.

With reference to WO 2014/063835 A1 a sequential combustor arrangement comprising a first burner, a first combustion chamber, a mixer or admixing a dilution gas to the hot gases leaving the first combustion chamber during operation, a second burner, and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the mixer for admixing the dilution gas to cool the hot flue gases leaving the first combustion chamber.

In addition WO 2014/063835 A1 describes a method for operating a gas turbine with at least a compressor, a combustor arrangement comprising a first burner, a first combustion chamber, a mixer for admixing a dilution gas to the hot gases leaving the first combustion chamber during operation, a second burner and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the duct for admixing the dilution gas to cool the hot flue gases leaving the first combustion chamber, and a turbine. The dilution gas is admixed into different regions of the cross section of the mixer or the dilution gas is injected through injection holes and/or second injection pipes and first injection pipes in order to introduce dilution gas into different regions of the cross section of the mixer.

Furthermore, attenuation of combustion dynamics by making use of Helmholtz dampers are widely used by all the companies operating in the gas turbine sector and several invention disclosures have been filed. The emerged state of the art focus on damper applications to can-annular-combustors. Adopting a Helmholtz damper around a can-combustor can be seen in the following documents:

US 2005/0166596 A1 describes a through-flow resonator, which when placed at or near the points having the highest acoustical pressure amplitudes within the flow path of a combustor system, effectively dampens instabilities from acoustic energy while avoiding an increase in mass air flow bypassing the system when a portion of the resonator is integral to a section of the system having a thickness in excess of about 0.10 inch. The acoustic damping performance of a resonator may be expressed in terms of acoustic conductance, which is defined as the in-phase component of volume velocity through the downstream set of holes, divided by the amplitude of pressure oscillation at the downstream face of the resonator. A high value of acoustic conductance indicates high damping performance. Consequently, the higher the acoustic conductance of a resonator, the fewer individual resonators required within a system, such as a gas turbine, to minimize potentially damaging combustion oscillations, or the greater the likelihood against the occurrence of such combustion oscillations.

US 2011/0220433 A1 provides the following solutions: A first aspect of the present object is a combustor including a cylindrical body that defines a combustion area therein, and an acoustic damper that includes an acoustic portion having an acoustic-damper resonance space communicating with the combustion area. The acoustic portion is provided along the cylindrical body so as to extend in a direction intersecting an axial direction of the cylindrical body. According to this aspect, because the acoustic portion having the acoustic-damper resonance space is provided along the cylindrical body so as to extend in the direction intersecting the axial direction of the cylindrical body, or the circumferential direction, the acoustic portion is disposed widely in the circumferential direction, without concentrating in a particular area of the cylindrical body in the circumferential direction. As a result, the acoustic portion is prevented from protruding toward the outer circumference of the cylindrical body, and the space needed outside the combustor can be reduced. Thus, because the casing can be made small, the housing constituting the casing can be made small. Because this enables, for example, the gas turbine to be adequately transported on the ground, it is possible to reduce the manufacturing costs, including the transportation costs. Furthermore, if the protrusion of the acoustic portion toward the outer circumference of the cylindrical body is reduced, the combustor can be easily extracted together with the acoustic damper. Thus, it is possible to improve the ease of maintenance of the combustor. The above-described aspect may further include an acoustic liner formed by a porous plate that constitutes the cylindrical body and has a plurality of through-holes penetrating in a thickness direction and a cover member that is provided around and at a certain distance from the porous plate so as to cover the porous plate, the acoustic liner having an acoustic-liner resonance space. By doing so, it is possible to attenuate oscillations in a frequency region that can be attenuated by the acoustic liner and oscillations in a frequency region that can be attenuated by the acoustic damper. Accordingly, it is possible to attenuate combustion oscillations in a wide frequency region. In the above configuration, it is preferable that at least part of the acoustic portion be provided on the outer circumferential side of the acoustic liner.

SUMMARY OF THE INVENTION

In order to introduce an innovative and inventive contribution to the mentioned state of the art, the basic idea of this invention is to make use of part of the mixer as damper. This can be done by using the proposed idea of having a variable pressure drop mixer. This allows to have a damper around the combustion chamber; the proposed invention has also the benefit to introduce improved fluid dynamic features of the mixer.

Accordingly, the basic idea of the proposed invention is to create a variable pressure drop mixer by making use of one or more separators (baffles) in between the mixer plenum volume. This creates a mixer with a plenum that is divided in compartments with each a certain pressure (this is due to the pressure drop across each separator). The different dilution medium (hereinafter referred to as dilution air) pipes of the mixer will be collected in groups and each of these groups is in fluid dynamic connection with a different compartment of the plenum. This leads to a different pressure drop across (between compartment and combustion chamber) each dilution air pipes group. This allows certain dilution air pipe groups to have a pressure drop high enough to have good penetration in the hot combustion gas, and other groups to have small enough pressure drop to allow cold air to stay relatively close to the combustion chamber wall.

In contrast, a mixer with only one mixer plenum will not allow a different pressure drop between different groups of pipes.

The mentioned separators inside of the mixer plenum volume will induce acoustic decoupling of the different compartments. The degree of decoupling depends on the pressure drop across the separators, high pressure drop means higher acoustic decoupling. This acoustic decoupling will results in the fact that the different compartments with their relative mixer pipes will have different resonance frequency. If acoustic pulsation occur in the combustion chamber (for instance due to combustion instabilities) at a frequency that matches the resonance frequency of the mixer plenum, a feedback amplification loop can occur that enforces even more the pulsations in the combustion chamber and results is strong dilution air fluctuations. This is detrimental for the combustor operation.

The separation of the mixer plenum in compartments that are acoustically decoupled means that an acoustic pulsation at a certain frequency will strongly excite only the compartment, with relative dilution air pipes, that has a resonance matching the pulsation frequency. The rest of the mixer (other compartments with relative dilution air pipes) will not be affected.

Thus, the main idea of the invention is to make use of at least one part of the mixer as damper.

Thus, there are two technical problems that should be solved:

Firstly, cooling air should be provided close to the mixer wall by air coming from the mixer plenum through suitable dilution air pipes. This air flow should have a pressure drop considerably smaller than the usual pressure drop of the dilution air through the mixer tubes or pipes. This is to allow a small penetration of this cooling air while a good penetration of the dilution air is kept.

Secondly, in presence of acoustic pulsations, the mixer does not respond as a single resonator but it is characterized by several (two or more) resonances, one per compartment division. This is beneficial to limit possible coupling between cooling air fluctuations and combustion chamber dynamics to a part only of the mixer.

Besides these technical problems, the proposed idea aims at the design of a broadband damping device that can be placed at or around the liner of a can combustor. This damper is basically composed by a group of dilution air pipes and at least one compartment.

However, the proposed object of invention tunes the fluid dynamic and acoustic properties of the mixer plenum, such that part of the mixer performs as a damper. Additionally the patent induces operational flexibility to the mixer such that the degree of penetration of the dilution air can be modulated in order to have at the same time good penetration in some sections and low penetration in other sections that serve as enhancement of the combustor walls cooling.

Generally, the plan is to use the object invention to damp the thermo-acoustic instabilities rising in the combustor of many gas turbine engines.

Furthermore, the mixer comprising at least one group of injection pipes pointing inwards from the side walls of the mixer for admixing the dilution air to cool the hot flue gases leaving the first combustion chamber. The injection pipes are circumferentially distributed along the side wall of the mixer and wherein the injection pipes having a cylindrical, conical or quasi-conical shape addressed to the center of the mixer.

For example, the injection pipes of a first group have a first protrusion depth into the hot gas flow path, the second injection pipes of the second group have a second protrusion depth, and the third injection pipes of the third group have a third protrusion.

The mixer is arranged such that the dilution air is admixed during operation to cool the hot gases.

Moreover, the protrusion depth of the second group is bigger than the protrusion depth of the third group; viceversa the number of the injection pipes of the third group can be bigger than the number of injection pipes of the second group.

For example, the number of injection pipes can be chosen such that the distance between the exit-openings of neighboring injection pipes are similar. Similar in this context can mean that the distance between exit openings in the group with larger penetration depth is one to three times the distance between exit openings of injection pipes of the group with smaller penetration depth. The distance between exit openings can further be increased with the exit diameter of the injection pipes. For example it can be proportional to the exit diameter.

Moreover, the mixer comprising in the hot gas flow direction at least one row of injection pipes with equal, similar or different protrusion depth, wherein the mixer comprising multiple rows of injection pipes in the hot gas flow direction with equal, similar or different protrusion depth.

At least one injection pipe group is circumferentially distributed along the side wall of the mixer and having a staggered design relative to a plane normal to the main flow direction of the hot gases flowing through the mixer, wherein the stagger is between 0.1 and 3.5 times the diameter of the relative injection pipes.

The protrusion depth of the injection pipes of a first row is closer to the center of the mixer than the protrusion depth of a second row, then, the protrusion depth of the second row is closer or farther to the center of the mixer than the protrusion depth of the third row, wherein the injection pipes of the single row extending approximately to the center of the mixer and are arranged in radial direction inversely to each other.

The injection pipes can be comprised along their protrusion depth a number of injection holes used to inject orthogonally or quasi-orthogonally the flowed dilution air into the hot gas flow. Furthermore, the injection pipes having uniform or non-uniform conical gradient along the respective protrusion depth.

Moreover, the injection pipes can be inclined in the hot gas flow direction at an angle of less than 90° relative to the flow direction of the hot gases such that the dilution air leaving the pipes have a flow component in the direction of the hot gas flow at the location of the injection.

The number of injection pipes in accordance with the number of compartments can be chosen in dependence on the configuration of the correspondent mixer arrangement. Similar in this context can mean that the distance between exit openings referring to the group with a larger penetration depth corresponds to one to three times the distance with respect to the group with smaller penetration depth. The distance between exit openings can further be increased with the exit diameter of the injection pipes.

The diameter, length and number of these pipes in connection with the various compartments are designed to admix dilution air into the hot gas flow such that the required local mass flow and temperature drop are achieved with a low pressure drop. Typically the injection pipes allow admixing of dilution air with a pressure drop of 0.4% to 2% of the total pressure of the dilution air pressure before admixing. With a low pressure drop at the inlet of the injector pipes, a pressure drop of 0.2% to 1% of the total pressure of the dilution air pressure before admixing can be sufficient. To reduce the inlet pressure drop rounded pipe inlets can be used Summary of individual preferred embodiments of the invention:

The dilution air plenum of the mixer having an annular form around hot gas flow path.

The dilution air plenum of the mixer includes one or more separators, which divide the dilution air plenum into a corresponding number of regular or individually formed compartments.

The single compartment of the mixer comprising at least one injection pipe.

Each compartment of the mixer offers a different pressure due to the pressure drop across each separator.

The compartments of the mixer are individually pressurized by a continuous dilution air flow inside of the mixer.

The compartments of the mixer are individually charged by a second dilution air flow.

The injection pipes of the mixer are circumferentially arranged inward from the side walls of the mixer, with a regular or irregular partitioning in circumferential direction.

The injection pipes of the mixer having a cylindrical, conical or quasi-conical shape.

The mixer comprising multiple injection pipe rows along the hot gas flow with equal, similar, different protrusion depth.

The injection pipes of the mixer having an equal, similar, different cross-section.

The injection pipes of a single row extending to the center of the mixer and are arranged in radial direction inversely to each other.

At least one injection pipe of the mixer is inclined with respect to the hot gas flow.

At least one injection pipe of the mixer having along their protrusion depth a number of injection hole using to inject orthogonally or quasi-orthogonally flowed dilution air into the hot gas flow.

The main advantages of the invention are the following:
1. By using a variable pressure drop mixer, part of it can be used to act as a damper around the combustion chamber.
2. Shorter mixer arrangement.
3. More stable mixer exit profiles, i.e. less oscillations in temperature fluctuations.
4. Uniform injection velocity, i.e. mixing with low pressure drop, i.e. better performances.
5. Elimination of Strouhal-Instability trough varying pipe diameter, i.e. more stable combustion (less pulsation, less sensitive to BC changes).
6. The proposed invention has also the benefit to introduce improved fluid dynamic features of the mixer.
7. Use of the mixer as a damper.
8. The mixer induces acoustic decoupling of the different compartments.

BRIEF DESCRIPTION OF THE FIGURES

The disclosure, its nature as well as its advantages, shall be described in more detail below with the aid of the accompanying figures. Referring to the figures.

DETAILED DESCRIPTION OF EXEMPLARY EMBODIMENTS

Figure 1:
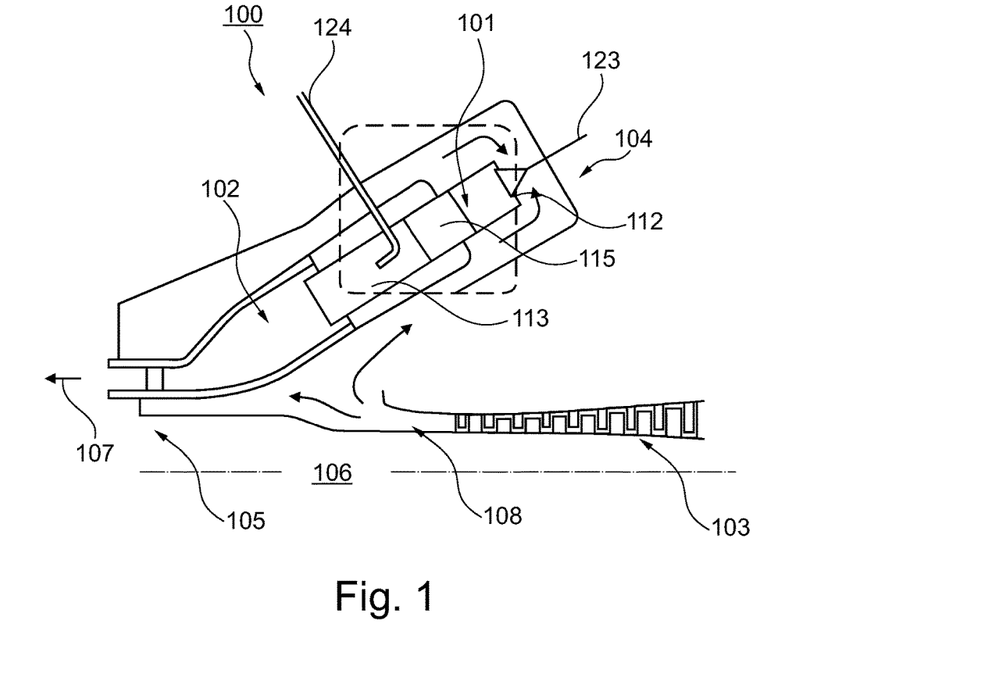
FIG. 1 shows a generic gas turbine engine using sequential combustion comprising a dilution air mixer arrangement for admixing dilution air.

FIG. 1 shows a gas turbine engine 100 with a sequential combustor arrangement 104 according to the disclosure. It comprises a compressor 103, a combustor arrangement 104, and a turbine 105. The combustor arrangement 104 comprises a first burner 112, a first combustion chamber 101, and a mixer 115 for admixing a dilution air to the hot gases 109 (see FIG. 2) leaving the first combustion chamber 101 during operation. Downstream of the mixer 115 the combustor arrangement 104 further comprises a second burner 113, and a second combustion chamber 102. The first burner 112, first combustion chamber 101, mixer 115, second burner 113 and second combustion chamber 102 are arranged sequentially in a fluid flow connection. Fuel can be introduced into the first burner 112 via a first fuel injection 123, mixed with compressed air which is compressed in the compressor 103, and combusted in the first combustion chamber 101. Dilution air is admixed in the subsequent mixer 115. Additional fuel can be introduced into the second burner via a second fuel injection 124, mixed with hot gases 109 (see FIG. 2) leaving the mixer 115, and combusted in the second combustion chamber 102. The hot gases 109 (see FIG. 2) leaving the second combustion chamber 102 are expanded in the subsequent turbine 105, performing work. The turbine 105 and compressor 103 are arranged on a shaft 106. The remaining heat of the exhaust gas 107 leaving the turbine 105 can be further used in a heat recovery steam generator or boiler (not shown) for steam generation. In the example shown here compressor exit gas is admixed as dilution air. Typically, compressor exit gas is compressed ambient air 108. For gas turbines with flue gas recirculation (not shown) the compressor exit gas is a mixture of ambient air and recirculated flue gas. Typically, the gas turbine system includes a generator (not shown) which is coupled to a shaft 106 of the gas turbine 100.

Accordingly, the proposed design having a broadband damping device that can be placed at or around the liner of a can combustor. This damper is basically composed by a group of dilution air pipes and at least one compartment.

Figure 2:
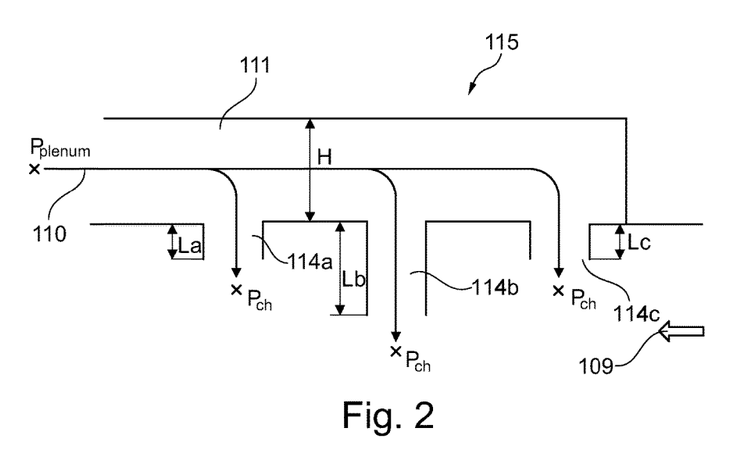
FIG. 2 shows a dilution air mixer with a number of injection pipes according to the state of the art.

FIG. 2 shows a dilution air mixer 115 according to the state of the art. In this example compressed gas from the compressor plenum is guided along combustor liner in a connection duct 111 as plenum of the dilution air 110. From the connection duct 111 the dilution air 110 is injected into the mixer via injection pipes 114a-c having various lengths L a-c. The connection duct 111 has a cross section with a height H.

The pressure drop between the plenum 111 and the combustion chamber 113 ($P_{plenum}-P_{ch}$), that corresponds to the pressure drop through the dilution air pipes 114a-c that is the same for all dilution air pipes. The penetration of the dilution air in the combustion chamber is driven by the pressure drop and the pipe length (protrusion depth).

The dilution air mixer 115 can be arranged with an annular cross section. For an annular dilution air mixer the height H is the difference between the diameter of an outer wall of the annular flow section and the inner wall of the annular flow section. For a dilution air mixer with a cylindrical cross section (can-like mixer arrangement) the height H is the diameter of the cross section. The height L a-c of the various subsequently arranged injection pipes 114a-c are chosen such that good mixing of injected dilution air 110 with the hot gas 109 leaving the first combustion chamber is assured.

Figure 3:
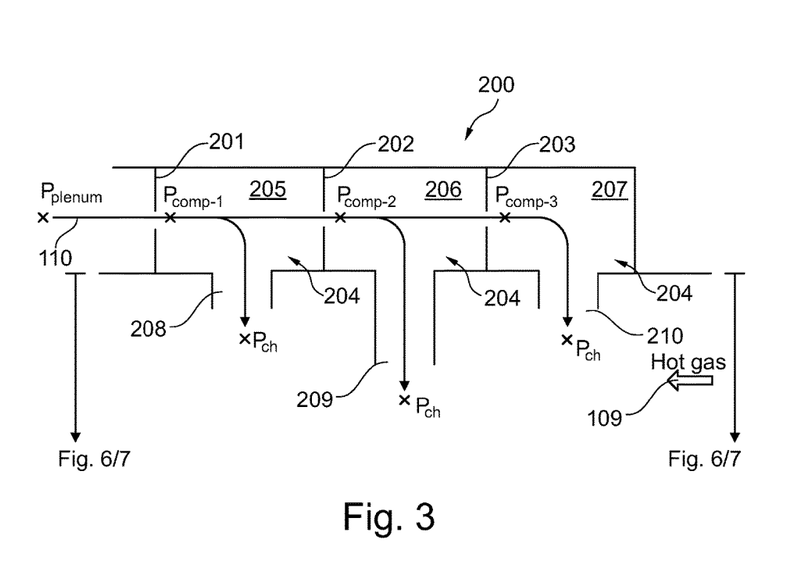
FIG. 3 shows an inventive dilution air mixer, whose plenum is divided in compartments; each compartment having a different pressure.

FIG. 3 shows a further dilution air (110 with an initial pressure $P_{plenum}$) mixer 200 having a variable pressure drop by making use of one or more separators (baffles) 201, 202, 203 in between the mixer plenum volume 204. The mixer plenum volume is divided in various compartments 205, 206, 207. Each compartment has a different pressure $P_{comp-1}$, $P_{comp-2}$, $P_{comp-3}$ due to the pressure drop across each separator 201-203. The different dilution air pipes 208, 209, 210 of the mixer 200 can be collected in groups and each of these groups is in fluid dynamic connection with a different compartment of the mixer air plenum 204. Accordingly, the dilution air flowing through the individual pipes 208, 209, 210 has a pressure $P_{ch}$ which stands in relation to the corresponding pressures within the single compartments 205, 206, 207, and the mentioned pressures $P_{ch}$ being actively connected to the pressure of the hot gas flow 109.

This configuration leads to a different pressure drop across each dilution air pipes group between compartment and combustion chamber. This allows certain dilution air pipes groups to have a pressure drop high enough to have good penetration in the hot combustion gas, and other groups to have small enough pressure drop to allow cold air to stay relatively close to the combustion chamber wall.

The separators 201-203 induces acoustic decoupling of the different compartments 205-207. The degree of decoupling depends on the pressure drop across the separators, i.e. high pressure drop means higher acoustic decoupling.

The acoustic decoupling results in the fact that the different compartments 205-207 with their relative dilution air pipes have different resonance frequency. If acoustic pulsation occur in the combustion chamber at a frequency that matches the resonance frequency of the mixer plenum, a feedback amplification loop can occur that enforces even more the pulsations in the combustion chamber and results is strong dilution air fluctuations.

The separation of the mixer air plenum 204 in compartments 205-207 that are acoustically decoupled means that an acoustic pulsation at a certain frequency will strongly excite only the compartment, with relative dilution air pipes, that have resonance frequency close to the frequency of the acoustic pulsation and all the other compartments, with relative dilution air pipes, will not be affected.

Figure 4:
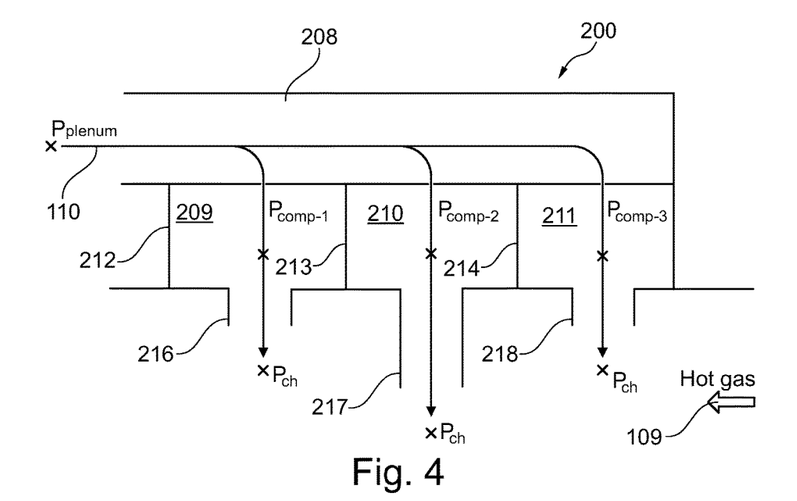
FIG. 4 shows an alternative embodiment referring to a dilution air mixer comprising a superimposed dilution air flow compared to the compartment.

FIG. 4 largely corresponds to the configuration in FIG. 3, with the difference that a superposed air plenum 208 is available, from which the compartments 209-211 are individually applied, wherein the individual pipes in this Figure bear the numbering 216, 217, 218. Each compartment has a different pressure $P_{comp}$ due to the pressure drop across each separator 212-214.

Figure 5:
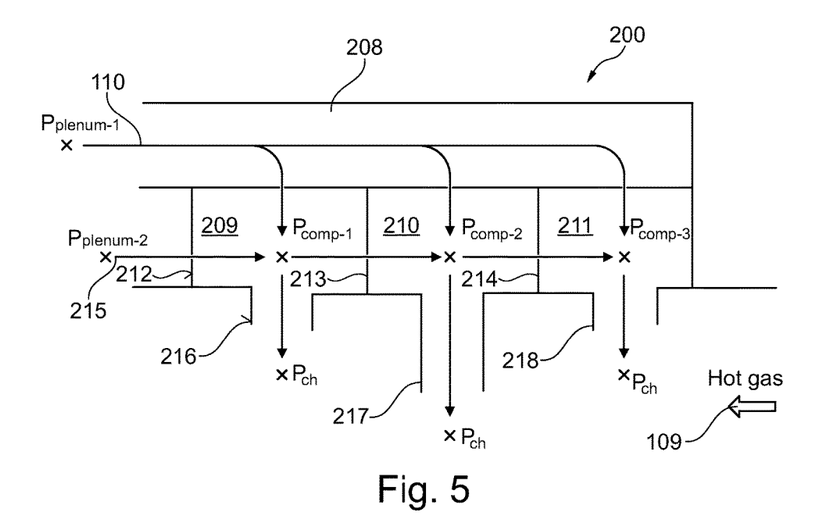
FIG. 5 shows further alternative embodiment referring to a dilution air mixer comprising various dilution air flows.

FIG. 5 largely corresponds to the configuration in FIG. 4, with the difference that a superposed air plenum 208 is available, from which the compartments 209-211 are individually applied. Each compartment has a different pressure $P_{comp}$ due to the pressure drop across each separator 212-214. Additionally, a second dilution air flow 215 applies individually the compartments 209-211, creating a refinement of the individual pressure $P_{comp}$ in the different dilution air pipes 216, 217, 218. Referring to the individual pressures and their operational context, the annotations in FIG. 3 are to be used.

Figure 6:
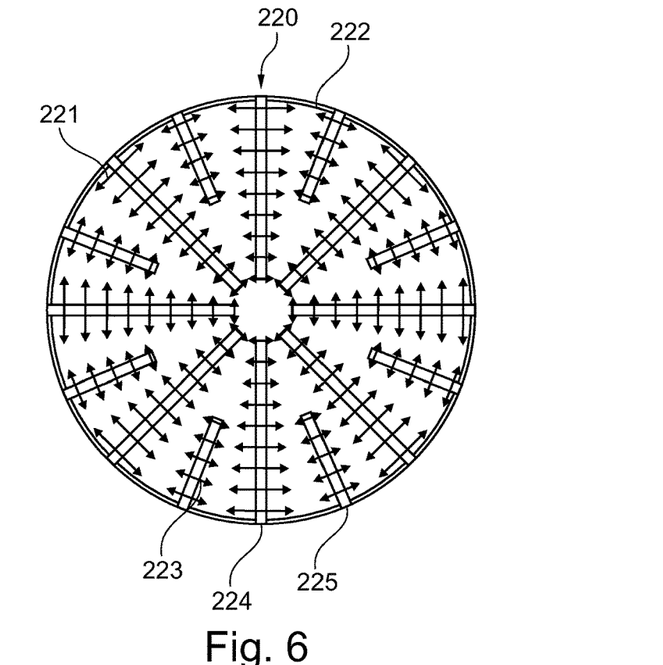
FIG. 6 shows a cross section of a mixer comprising a number of injection pipes mounted circumferentially and extending in radial direction.

FIG. 6 shows a baseline of a preferred embodiment of the invention in which a series of injection pipes 224, 225 are mounted radially and fed by a further plenum with dilution air flow 220. In the Figure the hot gas flow generated by the first combustor flows through the radially disposed long injection pipes 224, and intermediated disposed short injection pipes 225. Both, the long and the short injection pipes are directed radially towards the center of the mixer 222, wherein the long injection pipes 224 extending nearly to the center of the mentioned mixers. The disposition of the injection pipes 224, 225 in the circumferential direction of the mixer is uniformly provided, wherein a non-uniform distribution is also possible. Each injection pipes 224, 225 are also equipped with a large number of injection holes 223 used to inject the flowed dilution air 221 into the hot gas flow 109 (see FIG. 4). The key feature of this mixer 222 reflects a good distribution of such injection holes 223 along the respective radial extension of the injection pipes 224, 225, so that the dilution air 220 is pre-distributed and therefore requiring a much shorter mixing time and length. In summary, the injection pipes, characterized by conical or other geometries, are arranged to cover the full cross sectional area with dilution air being injected into the hot gas flow, orthogonal to the page.

Figure 7:
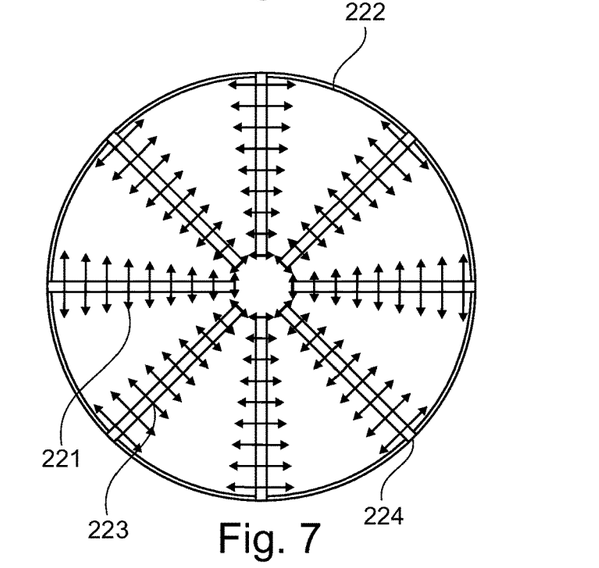
FIG. 7 shows further cross section of a mixer.

FIG. 7 shows a baseline of a further preferred embodiment of the invention in which a series of injection pipes 224 are mounted radially and fed by a further plenum with dilution air flow 220 (see FIG. 6). In the Figure the hot gas flow generated by the first combustor flows through the radially disposed long injection pipes 224, which having uniformly length. Accordingly, the injection pipes 224, as shown, are directed radially towards the center of the mixer 222, and they extending nearly to the center of the mixer. The disposition of the injection pipes 224 in the circumferential direction of the mixer is uniformly provided, wherein a non-uniform distribution is also possible. Each injection pipes 224, are also equipped with a large number of injection holes 223 used to inject the flowed dilution air 221 into the hot gas flow 109 (see FIG. 4). The key feature of this mixer 222 reflects a good distribution of such injection holes 223 along the respective radial extension of the injection pipes 224, so that the dilution air flow 220 (see FIG. 6) is pre-distributed and therefore requiring a much shorter mixing time and length. In summary, the injection pipes, characterized by conical or other geometries, are arranged to cover the full cross sectional area with dilution air being injected into the hot gas flow, orthogonal to the page. All injection pipes possess the same length.

Additionally, all the explained advantages are not limited just to the specified embodiments, methods or combinations but can also be used in other alternatives or alone without departing from the scope of the disclosure. Other possibilities are optionally conceivable, for example, for deactivating individual burners or groups of burners of the mentioned gas turbine engines. Furthermore, the dilution air, or generally dilution medium, can be re-cooled in a cooling air cooler before admixing into the corresponding mixer.

LIST OF REFERENCES NUMEROUS

100 Gas Turbine
101 First combustor chamber
102 Second combustor chamber
103 Compressor
104 Combustor arrangement
105 Turbine
106 Shaft
107 Exhaust Gas
108 Compressed Air
109 Hot gas flow, path
110 Dilution air
111 Connecting Duct
112 First burner
113 Second burner
114a Injection pipe, dilution air pipe
114b Injection pipe, dilution air pipe
114c Injection pipe, dilution air pipe
115 Mixer arrangement
200 Mixer arrangement
201 Separator (baffle)
202 Separator (baffle)
203 Separator (baffle)
204 Mixer air plenum
205 Compartment
206 Compartment
207 Compartment
208 Superposed air dilution plenum
209 Separator
210 Separator
211 Separator
212 Compartment
213 Compartment
214 Compartment
215 Second dilution air flow
216 Injection pipe, dilution air pipe
217 Injection pipe, dilution air pipe
218 Injection pipe, dilution air pipe
220 Dilution air flow
221 Dilution air into the hot gas flow
222 Mixer arrangement
223 Injection hole
224 Injection pipe
225 Injection pipe
La-c Height of the various injection pipes
H Height of the annular dilution air plenum
$P_{ch}$ Pressure exit pipe
$P_{plenum}$, $P_{plenum-1}$, $P_{plenum-2}$, Pressures plenum
$P_{comp-1}$, $P_{comp-2}$, $P_{comp-3}$ Pressures compartments

The invention claimed is:

1. A combustor arrangement of a gas turbine engine or power plant, comprising:
    at least one combustion chamber; and
    at least one mixer for admixing a dilution medium or air to a hot gas flow leaving one of the at least one combustion chamber, wherein the at least one mixer is configured to guide combustion gases in a hot gas flow path extending downstream of the one of the at least one combustion chamber, wherein the at least one mixer includes a plurality of injection pipes pointing inwards from side walls of the at least one mixer for admixing the dilution medium or air to cool the hot gas flow leaving the one of the at least one combustion chamber, wherein the at least one mixer includes at least one dilution air plenum, the at least one dilution air plenum including at least two baffles which divide the at least one dilution air plenum into a plurality of individual compartments, each compartment is configured to receive a first dilution medium or air flow and to have a different pressure due to a pressure drop that occurs when the dilution medium or air passes through each of the at least two baffles, and each of the plurality of individual compartments is directly or indirectly connected to at least one injection pipe from the plurality of injection pipes.

2. The combustor arrangement according to claim 1, wherein the at least one dilution air plenum has an annular form around the hot gas flow path.

3. The combustor arrangement according to claim 1, wherein the plurality of compartments are configured to be individually pressurized by a continuous dilution medium or air flow.

4. The combustor arrangement according to claim 1, wherein the plurality of individual compartments are configured to be individually charged by a second dilution medium or air flow.

5. The combustor arrangement according to claim 1, wherein the injection pipes are circumferentially arranged inward from the side walls of the at least one mixer, with a regular or irregular partitioning in a circumferential direction.

6. The combustor arrangement according to claim 1, wherein the injection pipes have a cylindrical, conical, or quasi-conical shape.

7. The combustor arrangement according to claim 1, wherein the at least one mixer comprises: multiple injection pipe rows along the hot gas flow with equal, similar, different protrusion depth.

8. The combustor arrangement according to claim 1, wherein the injection pipes of the at least one mixer have an equal, similar, different cross-section.

9. The combustor arrangement according to claim 1, wherein the injection pipes of a single row extend to an axial center of the at least one mixer and are arranged radially with respect to the axial center and inversely to each other.

10. The combustor arrangement according to claim 1, wherein the at least one injection pipe is inclined with respect to the hot gas flow path.

11. The combustor arrangement according to claim 1, wherein the at least one injection pipe has along its protrusion depth a number of injection holes for injecting the dilution medium or air orthogonally or quasi-orthogonally into the hot gas flow relative to a flowing direction of the hot gas flow.

12. A method for operating a combustor arrangement of a gas turbine engine or power plant, having at least one combustion chamber, and at least one mixer for admixing a dilution medium or air to a hot gas flow leaving one of the at least one combustion chamber, wherein the method comprises:
    guiding, via the at least one mixer, combustion gases in a hot gas flow path extending downstream of the one of the at least one combustion chamber; and
    admixing, via a plurality of injection pipes pointing inwards from side walls of the at least one mixer the dilution medium or air to cool the hot gas flow leaving the one of the at least one combustion chamber, wherein the at least one mixer includes a dilution air plenum, the dilution air plenum includes at least two baffles which divide the dilution air plenum into a plurality of individual compartments, wherein each compartment is configured to receive a first dilution medium or air flow and to have a different pressure due to a pressure drop that occurs when the dilution medium or air passes through each of the at least two baffles, and each of the plurality of individual compartments is directly or indirectly connected to at least one injection pipe from the plurality of injection pipes.

13. The method according to claim 12, wherein the injection pipes of the at least one mixer are collected in groups, wherein each of these groups is in fluid dynamic connection with a different compartment from the plurality of compartments of the dilution air plenum.

14. The method according to claim 12 for operating the at least one mixer as a damper.

15. The method according to claim 14, wherein the at least one mixer induces acoustic decoupling of the plurality of compartments.

* * * * *